Figure 1:
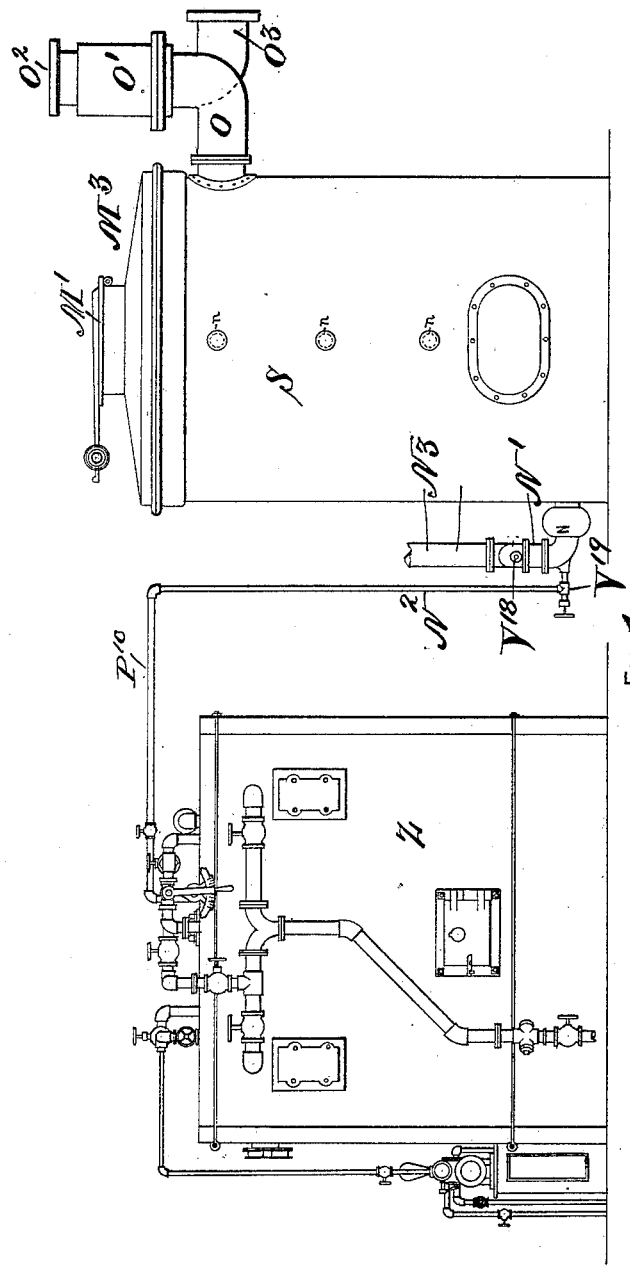

(No Model.) 3 Sheets—Sheet 1.

J. B. ARCHER.
APPARATUS FOR THE MANUFACTURE OF GAS.

No. 435,720. Patented Sept. 2, 1890.

Witnesses

Inventor (No Model.) 3 Sheets—Sheet 2.
J. B. ARCHER.
APPARATUS FOR THE MANUFACTURE OF GAS.
No. 435,720. Patented Sept. 2, 1890.
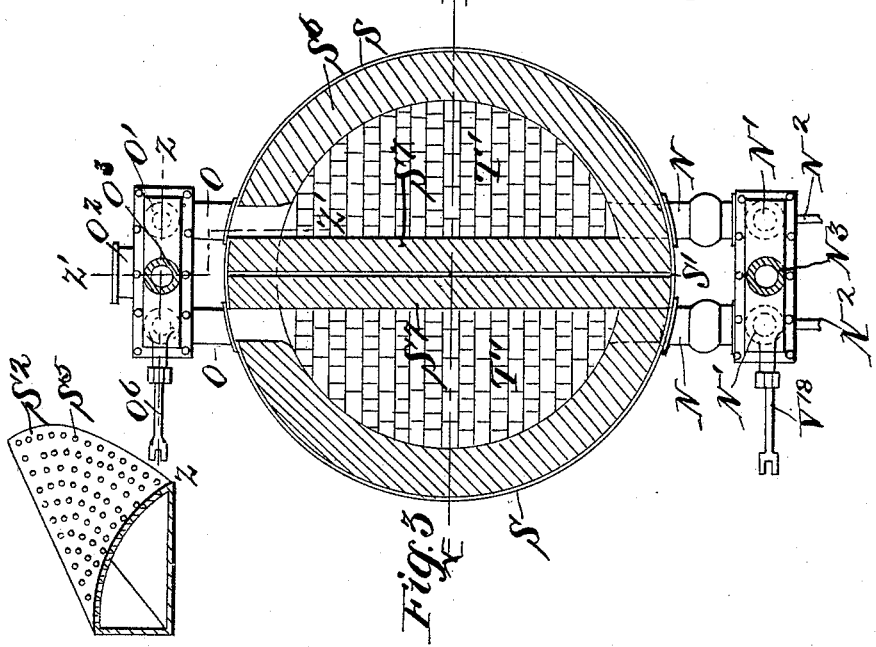
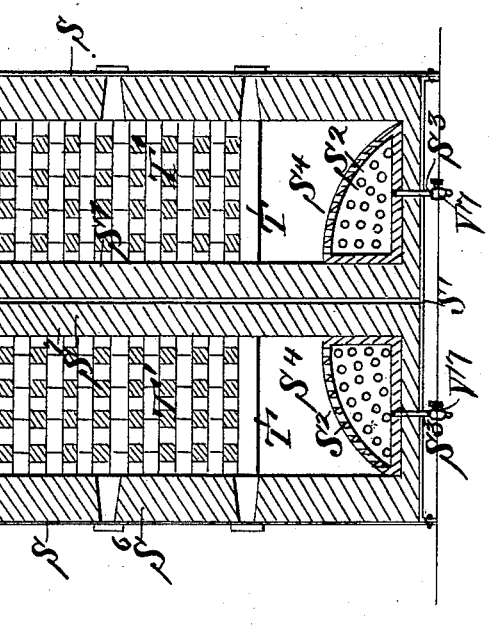
Witnesses
Inventor
John B Archer
Attorney (No Model.) 3 Sheets—Sheet 3.
J. B. ARCHER.
APPARATUS FOR THE MANUFACTURE OF GAS.
No. 435,720. Patented Sept. 2, 1890.
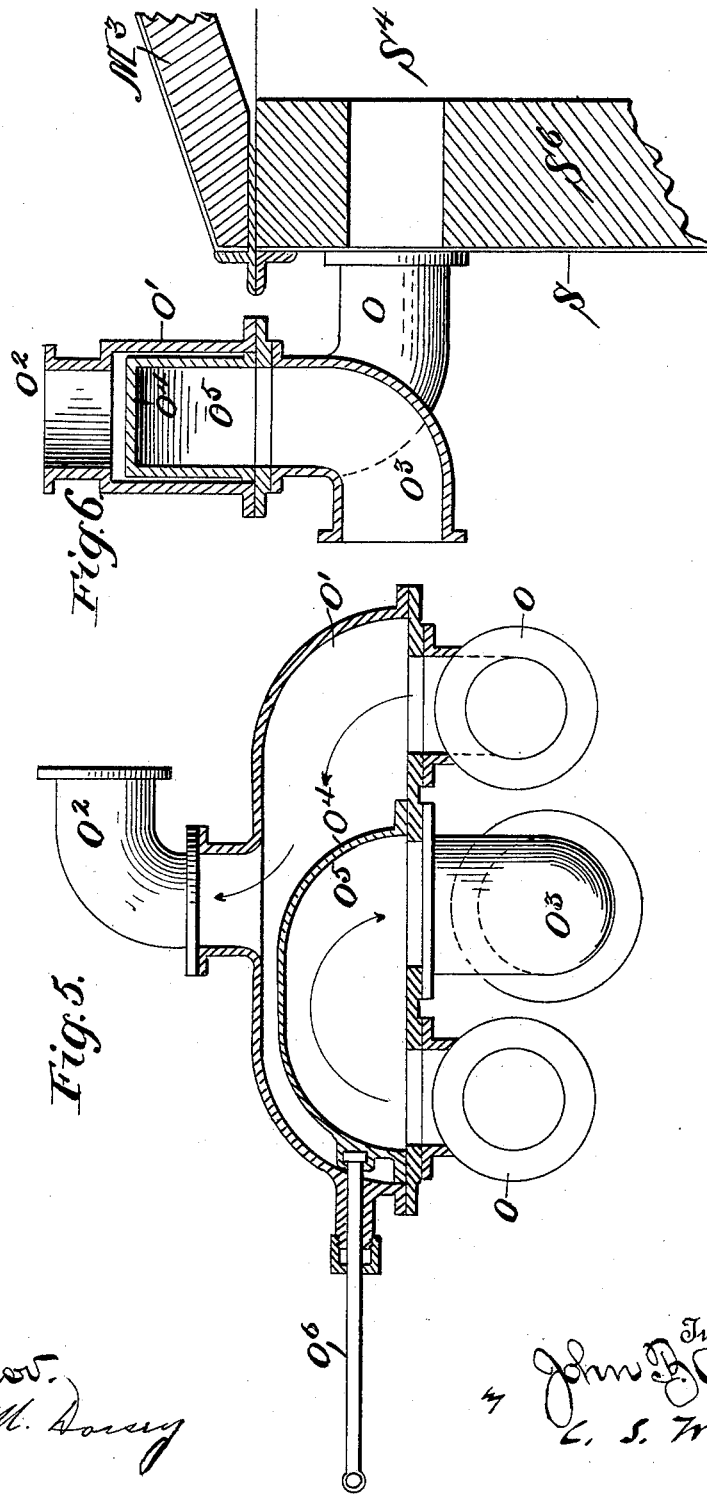

UNITED STATES PATENT OFFICE.

JOHN B. ARCHER, OF WASHINGTON, DISTRICT OF COLUMBIA.

APPARATUS FOR THE MANUFACTURE OF GAS.

SPECIFICATION forming part of Letters Patent No. 435,720, dated September 2, 1890.

Application filed October 21, 1889. Serial No. 327,652. (No model.)

*To all whom it may concern:*

Be it known that I, JOHN B. ARCHER, a citizen of the United States, residing at Washington, in the District of Columbia, have invented certain new and useful Improvements in Apparatus for the Manufacture of Gas; and I do hereby declare the following to be a full, clear, and exact description of the invention, such as will enable others skilled in the art to which it appertains to make and use the same.

My invention relates to certain new and useful improvements in gas-fixing chambers to be used more especially in the manufacture of illuminating-gas from fuel-gas; and it consists in means for fixing the gas by bringing it into contact with highly-heated refractory material which has already been heated by direct contact with the flame and products of combustion from a portion of the said gas, and for these purposes I provide a plurality of suitable chambers containing loosely-stacked refractory material and having gas and air-induction pipes attached thereto, and also eduction-pipes for the fixed gas and products of combustion, the said pipes having suitable valves therein, so that in one of the chambers the gas may be burned, thus heating the refractory material to a high degree of heat, while in the other chamber the gas is being fixed by the already highly-heated refractory material and the products of combustion and fixed gas from the respective chambers led to the desired points, as will be hereinafter more fully described and claimed.

Referring to the accompanying drawings, in which similar parts are designated by similar letters, Figure 1 is a side view of a suitable gas-producer connected with a fixer constructed according to my invention. Fig. 2 is a vertical central section of the fixer shown in Fig. 1, taken on the line $y\,y$ of Fig. 3. Fig. 3 is a horizontal section of the fixer. Fig. 4 is a detail perspective view of the tile-chamber. Fig. 5 is a detail vertical section on line $z\,z$ of Fig. 3. Fig. 6 is a detail vertical section on line $z'\,z'$ of Fig. 3.

The generator Z may be of any suitable construction for generating gas from hydrocarbon oil and steam.

The fixer consists of a cylindrical shell S, lined throughout with fire-brick or other refractory material $S^6$, and is provided with a central diametrical partition of iron $S'$, which is also protected by a brick lining $S^7$ on either side, thus forming twin receptacles or double chambers $S^4$, each chamber being independent of the other. One of these chambers only will be described, the other being exactly similar in all respects.

In the base of the chamber $S^4$ is placed a tile-chamber $S^2$, the top of which slopes from the forward inner corner thereof—*i. e.*, from the corner at the junction of the diametrical partition and outside walls—toward the rear and side walls, thus giving it a dome-like shape. The gas enters under this forward inner corner and rises through the perforations $S^5$ in the top thereof, the shape of the chamber causing it to be distributed evenly, while a drip-pipe $S^3$, provided with a valve $V^{17}$, serves to rid the base of the tile-chamber of any condensed or non-volatilizable matter contained in the gas.

In the chamber $S^4$, about one-fourth of the distance from the bottom thereof, is placed an open platform or grate of long narrow pieces of tile T, extending from side to side of the chamber with spaces between them and supported by the lining of the chamber. Upon this platform brick or other refractory material $T'$ is loosely stacked in the form of checker-work extending nearly to the top of the chamber, which is a dome $M^3$.

In the center of the dome is an opening M, which is closed by a removable cover $M'$, having a cylindrical lip $m'$, that sets down into a corresponding space $m^2$ in the walls $m$ of the opening M, and which is partially filled with water, thus forming a water-seal when the cover is closed and effectually preventing the escape of the gases from the interior of the chamber.

In the walls of the fixer, at intervals, are placed peep-holes $n\,n$.

The gas enters the tile-chamber through burners N, and I prefer to use burners of the construction shown in another application for Letters Patent, filed by me in the United States Patent Office on the 5th day of May, 1888, and serially numbered 272,903. The gas enters the burners by the pipes $N^2$, connected with the generator Z, and each burner is also supplied with a branch air-supply pipe $N'$, connected to the main air-supply pipe $N^3$, a suitable valve $V^{19}$ being placed in each of the pipes $N^2$ to regulate the gas-supply, and a reversing-valve $V^{18}$ is located at the junction of the branch and main air-supply pipes, whereby the air may be directed to either burner, as may be desired. The mouths of the burners are in the forward ends of the tile-chambers near the partition-wall, and the gas, or air and gas rising therefrom and striking the dome-shaped lower surface of the top of the tile-chamber will be evenly distributed, rising through the perforations therein into the chamber $S^4$.

Eduction-pipes O lead from the rear of the chambers $S^4$ from near the tops thereof into the bottom of a valve-chamber O' at either end thereof. From the top of the chamber O' rises a gas-eduction pipe $O^2$, while an eduction-flue $O^3$, for the products of combustion, opens into the chamber O' at the bottom thereof between the pipes O. A valve-block $O^4$, having an arched recess $O^5$, slides upon the floor of the chamber O', and may be caused by the handle $O^6$ to throw either one of the pipes O in communication with the gas-eduction pipe $O^2$ and at the same time to connect the other pipe O with the eduction-flue $O^3$ for the products of combustion. The valve $V^{18}$ may be similar to the above, except that the flue $O^3$ need not be used, the pipe $O^2$ serving as the main air-supply pipe, and the pipe O as the branch air-supply pipes.

The fixer is operated as follows: Air, gas, and vapors of oil are admitted through the burner N to one of the fixing-chambers, in the interior of which it burns, the products of combustion escaping to the flue $O^3$, the valves $V^{18}$ and $O^4$ being set for that purpose. The combustion in the interior of the chamber heats the checker-work placed therein to a high temperature, and the valves $V^{18}$ and $O^4$ are then reversed, thus admitting into the fixing-chamber gas and oil vapors alone, (without atmospheric air,) which is there fixed by contact with the hot brick, tile T', &c., and passes to the gas-eduction pipe $O^2$, the reversing of the valve $O^4$ having opened the way to the gas-pipe and closed that to the flue $O^3$ from the said first-named chamber. Gas and air are now entering the opposite chamber, and being ignited there serve to heat it, while the first chamber is cooling as it fixes the fuel-gas entering by the burner N into an illuminating or domestic fuel-gas, as may be desired. By varying the proportion of oil and steam (in the manufacture of what is known as "fuel-gas" in the producer) and by admitting to the converter a small portion of air through the burner N a gas may be produced of any grade of heating power and containing any desired relative amounts of hydrogen and illuminants, and therefore suitable for either illuminating-gas or for domestic fuel-gas for heating houses, cooking purposes, &c. By a proper manipulation of valves and dampers in the respective chambers of the fixer the fixing process goes on continuously, or, when desired, and a large amount of gas is required to fill a holder in a given time, of say four hours or less, gas may be passed simultaneously for the given time through both chambers, which have been previously heated, causing a doubling of the output of fixed gas for that period, or one chamber may be run for fuel-gas while the other chamber is being run for any desired grade of illuminating-gas. The highly-heated hydrogen of the gas continuously flowing through the bricks of the fixer-chamber, (which may be raised to a red or white heat,) before having time to lose its heat instantly intermingles with and permeates the particles of volatile carbon, which has the effect of separating and subdividing the particles of carbon and at the same time surrounding them uniformly with the proper proportion of hydrogen in such a manner as to render them non-condensable.

In another application filed by me on the 12th day of October, 1890, which application has been serially numbered 326,852, I have claimed the process described herein, and in the present application therefore it is my intention to claim only the hereinbefore-described apparatus.

Having thus described my invention, what I claim, and desire to secure by Letters Patent, is—

The combination, with the gas-generator, of fixing-chambers, pipes connecting the generator with the fixing-chambers, air-inlet pipes connected with the fixing-chambers, reversing-valves in the said air-pipes, a dome-shaped tile-chamber in the base of the fixing-chambers, eduction-pipes connected with the said fixing-chambers and with a valve-chamber, a gas-eduction pipe connected to the said valve-chamber, and a flue for the products of combustion, also connected with the said valve-chamber, as and for the purposes described.

In testimony whereof I affix my signature in presence of two witnesses.

JOHN B. ARCHER.

Witnesses:
VERNON MARTIN DORSEY,
C. F. KELLER.